United States Patent [19]

Kortenhaus

[11] 3,760,367

[45] Sept. 18, 1973

[54] SELECTIVE RETRIEVAL AND MEMORY SYSTEM

[75] Inventor: Dieter Kortenhaus, Bingen, Germany

[73] Assignee: MSM Apparatebau GmbH, Bingen/Rhine, Germany

[22] Filed: Jan. 24, 1972

[21] Appl. No.: 220,014

[30] Foreign Application Priority Data

Feb. 20, 1971 Germany .................. P 21 08 219.9

[52] U.S. Cl. .............................. 340/172.5, 340/162

[51] Int. Cl. ......................... G06f 13/02, G06f 15/40

[58] Field of Search .......................... 340/172.5, 162

[56] References Cited

UNITED STATES PATENTS

| | | | |
|---|---|---|---|
| 3,404,375 | 10/1968 | Snyder | 340/172.5 |
| 3,511,351 | 5/1970 | Jones | 340/162 X |
| 3,555,509 | 1/1971 | Arsem | 340/162 |
| 3,388,383 | 6/1968 | Shivdasani | 340/172.5 |
| 3,471,835 | 10/1969 | Gribble | 340/172.5 X |
| 3,543,247 | 11/1970 | Schrem | 340/172.5 |

*Primary Examiner*—Paul J. Henon
*Assistant Examiner*—Sydney R. Chirlin
*Attorney*—William E. Anderson et al.

[57] ABSTRACT

A selection and memory system for selectively retrieving data respectively stored at different addresses of a shift register memory facilitates the writing in of data to a shift register while stored data from that shift register is being read out. The system is advantageously employed for selectively retrieving one or more of a plurality of articles, such as record discs in an automatic photograph, where the data corresponds to a retrieval command signal stored within the memory at an address corresponding to the storage location of the article. The functional components of the system are readily suited for metal-oxide-semiconductor construction.

5 Claims, 2 Drawing Figures

PATENTED SEP 18 1973 3,760,367

SHEET 1 OF 2

SELECTIVE RETRIEVAL AND MEMORY SYSTEM

Figure 1:
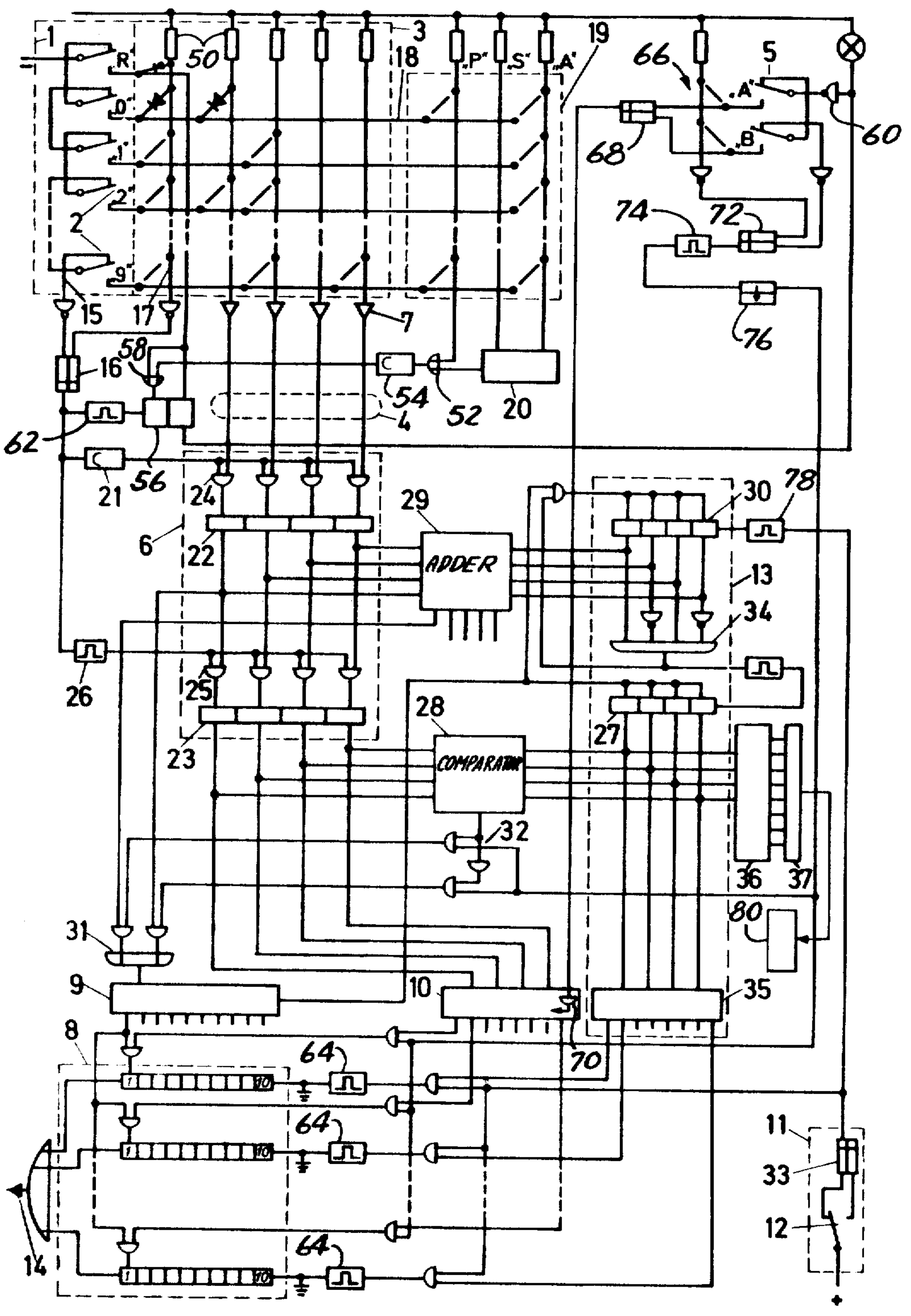

The present invention relates to a selection and memory system for selectively retrieving data stored at different storage addresses of a memory, and particularly to a system for selectively retrieving one or more of a plurality of articles, each being stored in respective predetermined storage locations. More particularly, the present invention relates to a selection and memory system for an automatic phonograph or the like for selecting and storing the selection information corresponding to each record side to be played. The present application is a continuation-in-part of Ser. No. 147,082, filed May 26, 1971, the disclosure of which is hereby incorporated into the present application by reference thereto.

Although the present invention may be adapted for use with various types of data and/or article retrieval systems, it is herein illustrated and described for use in conjunction with an automatic phonograph, such as a coin-actuated juke box typically having a number of individually playable record discs in a magazine and a carriage mounted for movement relative to the record magazine. The carriage commonly comprises means for removing an individual record from the magazine, clamping the record to a turntable, playing the record, and returning the record to the magazine. Record selecting means are typically employed to enable the operator to select sides of particular records, and a memory unit is provided to store the record side selection.

Heretofore, such automatic phonographs have generally included selection and memory systems of a fundamentally mechanical or electro-mechanical nature, as for example, electro-magnetic relays. These systems, however, generally require a great deal of expensive maintainance because of wear and other factors associated with mechanical contacts. Other systems for such automatic phonographs are known using magnetic cores as memories. However, the use of such core memories generally involves an extremely high labor cost for manufacture.

Moreover, control systems for automatic phonographs have heretofore been proposed which utilize essentially solid-state electronic elements, such as diodes, transistors and integrated circuits to provide faster operation and more economical construction. However, such systems generally employ such an extremely large number of discrete electronic components that they would result in very high labor costs for manufacture, as well as lead to a relatively high susceptibility to failure.

In the copending application identified above, there is disclosed an improved system for selectively retrieving one or more of a plurality of articles, such as records, by employing solid-state components, and particularly a shift register memory in conjunction with a buffer register, which may be economically manufactured by metal-oxide-semiconductor (MOS) techniques.

It is an object of the present invention to provide an improved system which may be manufactured from metal-oxide-semi-conductor (MOS) elements of well known and conventional design, and to provide such a system which will facilitate the writing in of data to a shift register of the memory while the stored data of that shift register is being read out.

It is a further object of the invention to provide an improved selection and memory system for coin-operated automatic phonographs which is particularly well adapted for metal-oxide-semiconductor techniques of construction, while providing the necessary functions and operations for such automatic phonographs at an especially low cost and high reliability as compared to that which would otherwise result from the performance of the same functions with other techniques of implementation.

Figure 2:
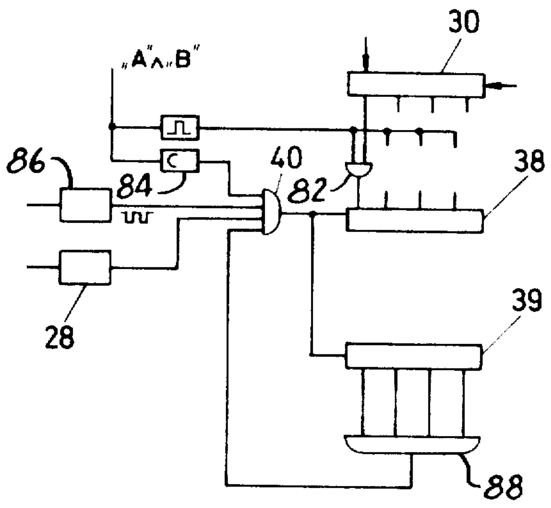

These and other objects of the invention are more particularly set forth in the following detailed description and in the accompanying drawing, of which:

FIG. 1 is a schematic logic diagram illustrating the system in accordance with an embodiment of the present invention; and FIG. 2 is a schematic logic diagram illustrating an alternative logic circuit which may be substituted for a part of the system illustrated in FIG. 1, in accordance with another embodiment of the present invention.

Briefly, referring to FIG. 1, there is shown a selection and memory system for selecting and storing the selection information for each record and record side to be played by an automatic phonograph, or the like, of the type having each record stored in a different predetermined storage location and record playing apparatus which is sequentially positionable in relative accessing and playing relation to the predetermined storage locations to play the record sides which have been selected.

The system, in general, comprises information input means 1, illustrated as having a first set of selection switches or keys 2 and a convertor 3, for providing a selectable encoded signal on the binary leads 4 corresponding to a given storage location within the record magazine containing the selected record disc. The information input means 1 also includes a second set of selection switches or keys 5 for generating a further signal determining the selection of a predetermined portion of the selected record, such as the particular record side of the disc to be played.

A buffer storage means 6 is responsive, through amplifiers 7, to the encoded signals on the leads 4 from the convertor 3, and stores each binary encoded selection signal until it is appropriately gated to control the writing in of a retrieval command signal, such as a logical 1, to a record storage address memory 8. (The buffer storage 6 also provides a selection error cancellation feature which is described in detail in the aforesaid copending application Ser. No. 147,082, and will not be discussed herein.) The buffer storage means 6 serves the main storage or memory 8 as an address register whereby an associated column decoder 9 and line decoder 10 are responsive to the encoded address information signals stored in the buffer storage means 6 for writing the retrieval command or information signal in the memory 8 at an address corresponding to the encoded signals, the column and line decoders providing decoded address information signals corresponding, respectively, to X and Y coordinates of the memory.

The memory 8 comprises a plurality of shift registers and, in a particular apparatus in accordance with the present embodiment of the invention, comprises sixteen shift registers $SR_1$ to $SR_{16}$, with ten stages in each register. The storage addresses of the memory correspond to the respective predetermined locations of the records. Each stage of the shift registers corresponds to an X coordinate of the memory and each shift register line corresponds to a Y coordinate, both being determined by the column and line decoders. The shift registers $SR_1$ to $SR_8$ are associated with one side of the records, and the shift registers $SR_9$ to $SR_{16}$ are associated with the other side of the records. The selection keys 5, designated "A" and "B", determine, by means of appropriate connecting gates, which section or half of the shift registers $SR_1$ to $SR_{16}$ will store the retrievel information at the address designated by the selection keys 2.

Control means, shown in simplified form as a mechanical switch 12, provides a synchronous control or timing signal while the carriage and associated record playing apparatus is moving to each consecutive record location. Read-out or interrogating means 13 responds to this control signal to consecutively interrogate, through appropriate logic gates, the storage addresses of the memory 8 in synchronism with the sequential access posi-tioning of the record playing apparatus relative to the storage locations of the records. The interrogation of the addresses of the memory 8 is accomplished by successively shifting each shift register through each of its stages in synchronism with the carriage movement, and reading the contents (i.e., a 0 or 1) of each stage at the output stage of the register.

An OR gate 14, which may include one or more stages of amplification, is responsive to the output stage of each shift register of the memory 8 while the memory storage addresses are consecutively interrogated to provide a retrieval command signal (i.e., logical 1) at the output of the OR gate 14 when the carriage is in accessing relation to the selected record. This causes the carriage to stop and the record playing apparatus to retrieve the given selected record on the basis of the retrieval information at the output of the memory. As discussed in greater detail in the aforementioned copending application, each cyclical operation of the record playing apparatus (i.e., retrieving, playing and returning the record) commences as soon as the retrieval command signal occurs at the output of OR gate 14, and then follows an automatic mode of operation which is known, per se, and does not form any part of the present invention. Preferably, when the present system is used with an automatic phonograph having a carriage mechanism which is reversible in the direction of movement, only half of the memory, $SR_1$ to $SR_8$ (or $SR_9$ to $SR_{16}$) is interrogated during one direction of movement of the mechanism. Thus, for example, all memory addresses of $SR_1$ to $SR_8$ are interrogated while the mechanism moves with shaft rotation in one direction to play only the "A" side of the records, and all memory addresses of $SR_9$ to $SR_{16}$ are interrogated when the mechanism operates with shaft rotation in the opposite direction to play only the "B" side of the records.

Since a selection may be made at keyboard 1 during the sequential interrogation of the memory 8, in the event that the selection involves a line code corresponding to the particular shift register being stepped or shifted at that time, means are provided to write the retrieval command signal in the correct storage address stage of that shift register (i.e., corresponding to the storage address defined by the selection input signal) even though it is being simultaneously shifted in the interrogation or read-out operation. In the system of the aforesaid application, selection input and read-out relative to a particular shift register which is being interrogated are accomplished by means of a buffer register within the memory which stores the selection until interrogation of that shift register is completed, after which the selection is transferred from the buffer to the appropriate memory shift register. In accordance with the present system, an internal position counter 30 is used for continuously storing the shifted register status and providing an output indicative thereof, an internal line counter 27 is used for storing the identifying indication of the register currently being shifted for interrogation of the memory, and a comparator 28 compares the output identifying indication of line counter 27 with the encoded address information in the line selection register 23 to provide a predetermined gating signal at 32 if and when the encoded input signal corresponds to a storage address (line or Y coordinate) that involves the register which is being shifted. Then, an adder 29 appropriately sums the output of the counter 30 and the contents of the column selection register 22 of the buffer storage means 6, which contents represents the binary encoded address information (column or X coordinate) signal indicative of the position or stage of that shift register. Logic means couples the sum output of the adder 29 to the position decoder 9 so that the latter receives the parallel binary input corresponding to the algebraic sum, representing an alternate address information signal, rather than the original binary position code itself. The position decoder 9 then writes the retrieval command signal into the corrected and alternate stage of the shift register such that when the interrogation of that shift register has been completed, the command signal is in the stage corresponding to the address information signal defined by the original selection code. This permits simultaneously writing a selection into and reading out from the same shift register, during the interrogation thereof. Also, aside from eliminating the need for the memory buffer register, the present system permits the reading out of the new selection during the same shift register or line interrogation, providing that this selection resulted in an alternate address information code corresponding to a stage in the shift register which had not yet been read out. This operation will be described in greater detail hereinafter.

More particularly, referring again to FIG. 1, the first set of selection keys 2 comprises ten pushbutton keys 0 to 9, and an associated correction or reset key R. The keys may be in the form of momentary action pushbutton switches normally biased in their outer or upper (reposed) position. The normally closed contact of each pushbutton switch is conductively connected to the movable contact of the immediately successive switch to form a series connection of the upper and movable contact portions of the entire switch sequence. A voltage is applied to the movable contact of the correction key R which, in its normal position, thus closes a circuit common to every other switch 0 to 9 inclusive, and terminates in an output lead 15. The output lead 15 delivers a signal which is inverted and then fed to one input of a bistable multivibrator 16. The normally open terminal of each key 0 through 9 is respectively connected to the decimal input of the convertor 3, but when any one of the selector keys 2 is depressed, the convertor 3 provides an electrical pulse on lead 17, which is inverted and fed to the other input of the bistable multivibrator 16. The multivibrator 16 is utilized to provide a clean or "bounceless" pulse from the mechanical switches of keyboard 1. This is accomplished by setting the multivibrator 16 with the pulse on lead 17 whenever any of the keys 2 are depressed, and then resetting the multivibrator 16 when the key is released by the pulse on lead 15 which is coupled to the reset terminal of the multivibrator through the inverter. The output of multivibrator 16 is then used to control various operations of the system, including the control of buffer storage means 6, as will be hereinafter described in greater detail.

Convertor 3 provides a binary encoded output signal in parallel form to the four output leads 4 after being amplified by the respective amplifiers 7. The binary coding on the output leads 4 corresponds to the particular decimal number of the depressed key. For a ten key keyboard, four binary bits are sufficient to represent any of the keys 0 through 9, and two digits are used for the selection of a given record. A complete selection of a given record side is made by depressing two keys 2 of the keyboard 1 (or the same key twice) and one of the two keys A or B of the selector keys 5. In the particular apparatus previously referred to, the system is designed for 80 records or 160 record sides. Of course, the system may be readily designed to handle any desired number.

The convertor 3 is of conventional design employing a diode matrix between column and line conductors, the column conductors each having a series voltage-dropping resistor 50 and being connected to a common voltage on a supply line shown at the top of FIG. 1. The binary encoded selection signal on leads 4 is thus derived from the column leads of the matrix, while the row or horizontal leads transfer the selector key information to an auxiliary convertor 19 which may be in the form of a wired unit or plug-in board. This transferred selector key information is effectively in parallel with the selector information which is encoded and fed to the buffer storage means 6 via the binary output leads 4. The auxiliary convertor 19 is illustrated as having three column leads designated "P", "S" and "A", associated respectively with prohibited selections, single selections, and albums. An output signal on the P, or prohibited area, lead indicates that the record location corresponding to the selection code entered on the keys 2 is not to be accessed by the system, either because it does not contain a record, or for some other reason. The S and A leads provide appropriate input signals to a credit meter 20 which determines whether a sufficient amount of credit units or money has been supplied to pay for the play, a different amount or computation being required depending on whether the selection is a single play or an album. The credit meter 20 may be of any suitable conventional type, and does not, per se, form a part of the present invention. The prohibited area function defined by the "P" connections may be used to effectively reduce the number of record side selections that the system would retrieve in any particular application. Additionally, if selected keys are bolted, the number of selections would be further reduced. Thus, if the keys 7 and 8 are bolted, the system would be appropriate only for the playing of 120 record sides.

Both the output of the credit meter 20 and the "P" lead of the auxiliary convertor 19 are coupled through an OR gate 52 to a delay circuit 54 which provides a delayed bistable signal pulse in the event that the selection is either prohibited or that insufficient credit units are available for the play. The delay signal is supplied to one input of a triggerable flip-flop 56 through an OR gate 58, the other input of which is coupled to the reset key R, which is also coupled to the other input of the flip-flop 56 for resetting. The output of the flip-flop 56 is coupled to the moving contact of the "A" switch on keyboard 5 through an inverter 60 and is thus also applied to the moving contact of the "B" switch, since the moving contacts and upper contacts are conductively connected in series and the upper position (as shown) is the normal position for the switches. Thus, an enable/disable condition of the system is determined through the circuit for keyboard 5 and is controlled by the state of the input signals on the flip-flop 56 when it is triggered by the differentiated output from bistable multivibrator 16 and differentiator 62 upon actuation of the keys 2.

The buffer storage means 6 is constructed similarly to that in the system of the aforesaid application and comprises two static four-bit registers, 22 and 23, for respectively storing each digit of the two digit selection code in the form of parallel binary encoded signals supplied from the respective outputs of the amplifiers 7 on leads 4. The first or column selection register 22 has four inputs coupled to respective AND gates 24. Each AND gate 24 has two inputs, one input from each of the amplifiers 7 (corresponding to each bit of the binary encoded digit signal) and the other input commonly supplied as a control gating pulse from delay circuit 21 which is triggered by the output from the bistable multivibrator 16. (The delay circuit 21, as well as the other delay circuits employed in the system, may be any conventional monostable multivibrator.) The outputs of the register 22 are coupled respectively to a second set of AND gates 25 having their outputs coupled to the input of the second or line selection register 23. The other input to the second set of AND gates 25 is provided by a transfer gating pulse from a differentiating circuit 26 which is driven by the output of the multivibrator 16. Consequently, each digit of the selection code entered on the selector keys 2 is first placed in the first register 22, and then on the next successive digit selection, the contents of the register 22 are transferred to the second register 23 and the second digit information is stored in the first register 22. The delay circuit 21 holds the gates 24 open for a sufficient time to ensure entry of the entire 4-bit code from amplifiers 7 into register 22.

The selection code information from the buffer storage 6 provides an address information signal to the memory 8 for writing the retrieval data or command, such as a logical "1", into the correct storage address of the memory. As previously indicated, the address information signal is provided in the form of a column or position code signal, in parallel binary form, corresponding to the output of the first register 22 and a line code signal, also in parallel binary form, corresponding to the output of the second register 23 of the buffer storage 6. The column and line code signals uniquely identify and define a particular record storage address within the first half of the shift registers $SR_1$ through $SR_8$, or within the second half of the shift registers $SR_9$ through $SR_{16}$, of the memory 8, depending on the record side selection made through the A and B selector keys 5.

The binary output from the second register 23 containing the line address information is supplied to the input of line decoder 10 which provides a signal on the appropriate singular output corresponding to the selected line, and this singular output signal is supplied to the respective AND gate at the input to the appropriate shift register through a differentiator 64, each shift register defining a line of the memory. The address information in binary form that is stored in the first register 22 is fed to AND and OR logic gates 31 which provide binary inputs to the column decoder 9. This decoder receives the input in binary form and supplies a singular output signal at one of ten output terminals corresponding to the binary input. This output signal is then supplied to an AND gate associated with each of the shift registers for that particularly selected column or position. The appropriate one of those AND gates for the selected address will also receive at its other input a signal from the selected line output of line decoder 10 (through its associated AND gate) to write the retrieval command signal into the selected address stage of the selected shift register.

With respect to the side selection made by the A or B switches of keyboard 5, a diode gate arrangement 66 is provided which is responsive to each alternative switch actuation to provide a set or reset signal to a multivibrator 68 which has its principal output coupled to a suitable gate 70 for actuating the portion of the line decoder 10 corresponding to the first eight shift registers of the memory in response to one signal level and for actuating another portion of the line decoder corresponding to the second eight shift registers in response to a different signal level from the multivibrator 68. Thus, one signal level is provided (and maintained) whenever the multivibrator is set by the A switch, and the other level is provided (and maintained) whenever the multivibrator is reset by the B switch. Also, when either switch is actuated, a second output pulse is provided by the circuit through another multivibrator 72 having its set input connected to the moving and upper contact circuitry of the A and B switches through an inverter, and its reset input coupled to a fixed voltage source through an inverter and series connected resistor. The output of the multivibrator is differentiated by differentiator 74 and triggers a one-shot 76 which provides a clean pulse of predetermined duration for enabling the AND gates at the input to each memory shift register stage so that the position decoder 9 and line decoder 10 can perform their addressing functions. This pulse also enables logic gates 32 in a manner to be described below.

With respect to retrieval of the command signals stored in the memory 8, each shift register is successively shifted, one at a time, so that the contents (i.e., a logical 0 or 1) of each stage of each shift register is provided at the output of the OR gate 14 in synchronism with the carriage movement as the carriage is in accessing relation to each record storage position. The timing signal required to maintain this synchronism is generated, as previously indicated, by control means 11 which includes switch contacts 12 associated with the carriage and playing apparatus, for providing pulses to drive a bistable multivibrator 33 to produce a clean train of synchronous timing pulses. These pulses are differentiated by differentiator 78 and fed to internal position counter 30 which registers each pulse and provides an output in binary form indicative of the accumulated count. This counter 30 is reset to its zero after each shift register has been shifted or stepped through its ten positions (and the carriage has moved through ten record storage locations). Thus, the output of counter 30 is always indicative of the position or stage of some shift register in the memory which is being read-out at any particular time.

The outputs from the position counter 30, with appropriate inversions, are fed to an AND gate 34 the output of which is differentiated an used to drive another counter 27. The counter 27 is stepped once for each full scale count of position counter 30 so that counter 27 provides a parallel binary output which is indicative of the particular line or shift register in memory 8 which is being interrogated or read-out at any particular time. The line count binary output signal from counter 27 is fed to an interrogating line decoder 35 which provides a singular output signal at its successive output terminals (corresponding to the parallel binary input code). The singular output signals are fed to an input of the AND gates respectively associated with each shift register, which have their other input coupled to the synchronous timing pulse train output from the multivibrator 33. The output of each AND gate is fed through a differentiator 64 to the shift terminal of its associated shift register. Thus, each shift register, in succession, as determined by the sequential outputs of decoder 35, is stepped or shifted by the successive timing pulses so that each stage of each register is sequentially read out. Although the shift terminal of each shift register is shown as being grounded, it is to be understood that these terminals are actually grounded through a resistance which may be the differentiator circuit resistor, maintaining the respective terminals at ground unless a pulse is generated by the differentiator.

In order to accomodate input selections from the keyboards during the interrogation or read-out operations, the contents of the line register 23 are compared with the contents of the internal line counter 27 by the comparator 28 which determines whether the memory is being interrogated in the same line in which a selection is to be written. If, by the input into the register 23, the same line is involved, the contents of the register 22 are algebraically added via the adder 29 to the contents of the counter 30 which counts the position or stage being read out. The output of the adder 29 is coupled to the gate complex 31 which is placed ahead of the position decoder 9. If the comparator 28 furnishes a "yes" or 1 logic output signal, then at the time of the actuation of one of the A or B selector keys 5, the gate complex 31 is so connected via the gates 32 that the output of the adder 29 is decoded to determine the column address, rather than the output of the position register 22. On the other hand, if the comparator 28 provides a " no" or logical 0 output signal, the output of register 22 is decoded. Thus, when the retrieval command signals are written into the memory, it is important to compare the contents of the internal line counter 27 with the contents of the line register 23 (i.e., comparing the selected line indicated with the line being shifted from which a read-out is being taken). If the selection information is now to be written into the shifted line, the address must be corrected and this address correction is made in a manner that the contents of the counter 30 is added by the four-bit parallel adder 29 to the address which is placed in the register 22, the five-bit output of the four-bit parallel adder 29 being ten-module coded.

The counter 30 is stepped or actuated by the action of the carriage switch 12 connected to the bistable multivibrator 23. If the carriage switch 12 continues to switch, the counter 30 is continuously increased by the value one. The gate 34, decoded for the value 10, is associated with the counter 30 as previously indicated. When this value 10 is obtained, the counter 30 is reset to zero. The counter 30 must count module 10, because only 10 bits are present in each line of the memory 8. Consequently, the counter 30 may only count up to the value 10 and is reset at higher values, whereby simultaneously the counter 27 is increased by the corresponding decade value. If the counter 30 has reached the value 10, the counter 27 must be increased by the value one, indicating that interrogation is now of the next successive shift register line.

Consequently, the counter 30 provides an output which indicates the number of previous shifts from zero which have thus far been made by the shift register. The operation of the adder 29 is based on a modulus of ten, since there are ten possible positions or stages of the shift register, and thus the algebraic sum from the adder 29 will be a binary representation of the selected input stage number less the number of previous shifts of the register (from counter 30). The modulus 10 would be added to this difference unless the sum were greater than 10. Stated another way, the circuit sums the selected input stage with the number of shifts remaining to complete the interrogation of the register (which is 10 less the number of previous shifts, starting with 0). Thus, for example, if the column register 22 contains the binary code corresponding to the sixth position or stage of the shift register, and at that moment the eighth stage of the shift register was being interrogated, then the adder 29 would algebraically sum $(6 - 7) + 10 = 9$. Or alternatively, $6 + (10 - 7) = 9$. If the result were greater than 10, then the difference would be taken based on the modulus of the system.

The encoded selection position code of six would be at that moment written into the ninth position or stage of the shift register. Therefore, when the interrogation of that shift register has been completed, the information from the ninth stage would be in fact in the selected sixth stage of the register. This can be seen from the following chart which shows the successive shifting of a single shift register from its initial or reset state through one complete cycle, during which all of the information contained in its ten stages is successively read out through the output thereof.

| | Shift register stages | | | | | | | | | |
|---|---|---|---|---|---|---|---|---|---|---|
| Output | 1 | 2 | 3 | 4 | 5 | 6 | 7 | 8 | 9 | 10 |
| | 2 | 3 | 4 | 5 | 6 | 7 | 8 | 9 | 10 | 1 |
| | 3 | 4 | 5 | 6 | 7 | 8 | 9 | 10 | 1 | 2 |
| | 4 | 5 | 6 | 7 | 8 | 9 | 10 | 1 | 2 | 3 |
| | 5 | 6 | 7 | 8 | 9 | 10 | 1 | 2 | 3 | 4 |
| | 6 | 7 | 8 | 9 | 10 | 1 | 2 | 3 | 4 | 5 |
| | 7 | 8 | 9 | 10 | 1 | 2 | 3 | 4 | 5 | 6 |
| X | 8 | 9 | 10 | 1 | 2 | 3 | 4 | 5 | 6 | 7 |
| | 9 | 10 | 1 | 2 | 3 | 4 | 5 | 6 | 7 | 8 |
| | 10 | 1 | 2 | 3 | 4 | 5 | 6 | 7 | 8 | 9 |
| | 1 | 2 | 3 | 4 | 5 | 6 | 7 | 8 | 9 | 10 |

The decoder 35 is used to control which line is being shifted. The shifting is accomplished, as previously indicated, by the synchronous timing pulses from the control means 11, which are applied to the shift input AND gates of all of the shift registers, but the decoder 25 determines the specific shift register line to be actuated by the timing pulses by sequentially enabling each of these AND gates in accordance with the output of counter 27.

The output of the inernal line counter 27 is also supplied to an additional decoder 36 which is coupled to a diode matrix 37 for shifting the speed of the turntable, through suitable control circuitry 80, to the appropriate value for the records in the storage locations corresponding to the particular line being interrogated. The diode matrix 37 may comprise any suitable read-only memory prewired to establish a turntable speed appropriate to the single play records and to the albums, which typically differ in their speed requirements, such as requiring 45 rpm and 33 ⅓ rpm, respectively. The speed control circuitry 80 is connected to the turntable motor and may be constructed in any suitable manner known, per se.

Referring now to FIG. 2, an alternative circuit is shown for the four-bit parallel adder 29. In accordance with the logic circuit shown in FIG. 2, the binary output corresponding to the column position being interrogated (as indicated by the internal position counter 30) is fed into a storage register 38 through input AND gates 82 upon being enabled by a differentiated pulse from the one-shot 76 (FIG. 1). This occurs when either an A or B key is actuated, indicating that a new selection is being made.

A delay circuit 84 is also actuated to produce a long enabling pulse to the AND gate 40. A multivibrator 86 supplies pulses to the AND gate 40 which are passed when the gate is enabled by the output from the comparator 28, indicating that a selection has been made which must be written in the line being interrogated. The parallel plus pulses are counted downward into a further storage register means 39 until the value zero has been reached, and thus the storage means 38 moves up to the result of the addition. The outputs from each stage of storage register 39 are fed to a logic gate 88 which disables the AND gate 40 when the value zero is reached. The output from the register 38 is then fed to the logic complex 31 at the input to decoder 9 as discussed in connection with FIG. 1. The multivibrator 86 may be used to form a parallel-to-serial convertor responsive to the parallel binary output of position register 22.

Alternative logic can, of course, be employed in accordance with the principles of the present invention. Also, if desired, only one shift register may be employed with a length sufficient to incorporate all of the necessary storage addresses, thereby eliminating the need for the comparator and the gates for shifting between the individual registers.

The various components shown and described may be of well known and conventional types and the various decoders in the system may be any conventional binary-to-decimal (or octal, etc.) convertors. The decoder 10, for example, may be of a type having two sets of alternate octal outputs controlled by a gate in any suitable manner to provide an output to either of the two eight shift register halves of the memory.

The entire system may be readily implemented with MOS devices, and the shift registers, multivibrators, gates and counters illustrated herein may be of any suitable MOS construction, well known, per se, to the art. The use of MOS construction results in a very low cost for the large number of functional active components that would be needed as compared with other forms of implementation, as well as providing a high density of components within a given space limitation.

Although the preferred embodiments have been shown in schematic form, and generally the logic for only one branch of plural branch systems is shown for clarity of illustation, the overall system will be understood by persons skilled in the art. Further, although only certain embodiments of the invention have been illustrated and described, various modifications thereof will be apparent to those skilled in the art; and accordingly, the scope of the invention should be defined only by the appended claims and equivalents thereof.

Various features of the invention are set forth in the following claims.

What is claimed is:

1. A selection and memory system for use in an automatic phonograph or the like, for selectively re-trieving data respectively stored at different storage addresses of a shift register memory, said system comprising:

means for writing data in said memory at an address cor-responding to an encoded selection input signal, said storage means comprising means for storing an address information signal defining a stage of said register corresponding to the selection signal interrogating means for sequentially reading out the storage addresses of said memory by successively shifting a shift register thereof, a counter for storing the status of said shift register, means for deriving from the output of said counter an al-ternate address information signal corresponding to the selection signal, means responsive to the alternate address information signal for placing said data into the sequentially correct stage of the shift register corresponding to the storage address defined by the encoded input signal as said register is being shifted by said interrogating means for sequential read-out of each storage address.

2. The system of claim 1 wherein said memory has a metal-oxide-semiconductor construction.

3. A selection and memory system for selectively retrieving data respectively stored at different storage addresses of a memory formed by a plurality of shift registers, said system comprising:

means for writing data in said memory at an address corresponding to an encoded selection input signal, said means having a first portion for storing address information defining one of said plurality of memory shift registers and a second portion for storing address information defining a stage of said one shift register;

interrogating means for sequentially interrogating the storage addresses of said memory by successively shifting the shift registers thereof;

a first counter for continuously storing the shifted register status and providing an output indicative thereof;

a second counter for storing an identifying count indicative of the register being shifted for interrogation of the memory and providing an output indicative thereof;

means for comparing the output identifying indication of said second counter with the address information in said first portion of said storage means to provide a predetermined gating signal when the encoded input signal corresponds to a storage address of the register being shifted;

means for adding the output of said first counter to the contents of said second portion of said storage means; and logic means coupling the output of said adding means to the memory shift registers for placing said data into the sequentially correct stage of the register being shifted, corresponding to the storage address defined by the encoded input signal, in response to said predetermined gating signal.

4. In an automatic phonograph, a selection and memory system for selecting and storing the selection information for each record to be played, each record being stored in a different predetermined storage location, said system comprising, information input means for providing a selectable encoded signal corresponding to a given record in a predetermined storage location, a shift register memory having storage addresses corresponding to the respective predetermined storage locations of said records, buffer storage means responsive to the encoded selec-tion signal for storing an address information signal defining a stage of a shift register of said memory corresponding to the selection signal, means responsive to the address information signal in said buffer storage means for writing a retrieval command signal into said shift register memory at an address corresponding to said encoded selection signal, interrogating means for sequentially reading out the storage addresses of said memory by successively shifting a shift register thereof, a counter for storing the status of said shift register, means for adding the output of said counter to said address information signal to provide an alternate address information signal corresponding to the selection signal, and means responsive to the alternate address information signal for placing said retrieval command signal into a sequentially correct stage of the shift register corresponding to the storage address defined by the encoded selection signal as said register is being shifted by said interrogating means for sequential read-out of each storage address.

5. The system of claim 4 for use with a phonograph having a multiple speed turntable, wherein said memory comprises a plurality of shift registers, a further counter for storing an identifying count indicative of the particular shift register being shifted for interrogation of the memory, and means responsive to said further counter for providing a signal defining one or another of said multiple speeds in accordance with a predetermined arrangement for each state of said further counter.

* * * * *

UNITED STATES PATENT OFFICE
CERTIFICATE OF CORRECTION

Patent No. 3,760,367 Dated September 18, 1973

Inventor(s) Dieter Kortenhaus

It is certified that error appears in the above-identified patent and that said Letters Patent are hereby corrected as shown below:

Title page, [73] Assignee:

"MSM Apparatebau GmbH" should read -- NSM Apparatebau GmbH --.

Signed and sealed this 1st day of January 1974.

(SEAL)
Attest:

EDWARD M.FLETCHER,JR.
Attesting Officer

RENE D. TEGTMEYER
Acting Commissioner of Patents